United States Patent
Porret et al.

[15] 3,635,844
[45] Jan. 18, 1971

[54] CURABLE MOLDING COMPOSITIONS COMPRISING A POLYEPOXIDE AND A HYDANTOIN

[72] Inventors: Daniel Porret, Binningen; Juergen Habermeier, Allschwil; Wolfgang Seiz, Basel; Willy Fatzer, Bottmingen, all of Switzerland

[73] Assignee: Ciba Limited, Basel, Switzerland

[22] Filed: Nov. 17, 1969

[21] Appl. No.: 877,484

[30]  Foreign Application Priority Data

Nov. 22, 1968   Switzerland ........................17418/68

[52] U.S. Cl. ......................260/2 N, 117/161 ZB, 161/184 R, 260/18 EP, 260/9 R, 260/28 R, 260/29.1 R, 260/37 EP, 260/47 EN, 260/59 R, 260/77.5 R, 260/78.4 EP, 260/830, 260/831 R, 260/834 R
[51] Int. Cl...........................................................C08g 30/14
[58] Field of Search ..................260/47 EP, 2 EP, 18 EP, 59, 260/830, 78.4 EP, 309.5

[56]  References Cited

FOREIGN PATENTS OR APPLICATIONS 3,517,232   11/1960   Japan
  963,507    7/1964   Great Britain ....................260/47 EP

*Primary Examiner*—William H. Short
*Assistant Examiner*—T. Pertilla
*Attorney*—Harry Goldsmith, Joseph G. Kolodny and Mario A. Monaco

[57]  ABSTRACT

Curable molding, coating and adhesive compositions which contain a polyepoxide compound, for example a liquid polyglycidyl ether of bisphenol A, and, as the curing agent, an N,N'-di-(γ-aminopropyl)-hydantoin, for example 1,3-di-(γ-aminopropyl)-5,5-dimethyl-hydantoin. Curing can be carried out at relatively low temperatures, for example at 40° C. The new type of curing agent bridges, in respect of its gradation of reactivity, a gap between aliphatic polyamines and cycloaliphatic polyamines. The new curing agents furthermore have the advantage relative to the aromatic polyamines of being nontoxic.

14 Claims, No Drawings

CURABLE MOLDING COMPOSITIONS COMPRISING A POLYEPOXIDE AND A HYDANTOIN

It is known that epoxide resins can be cured by monobasic or polybasic aliphatic, cycloaliphatic or aromatic amines. Curing with aliphatic amines, such as diethylenetriamine, triethylenetetramine or hexamethylenediamine leads, even in the cold or at room temperature, to products having good mechanical properties which however do not always suffice for the highest requirements. The aliphatic polyamines are furthermore not physiologically harmless. The cycloaliphatic polyamines, such as diaminodicyclohexylmethane, are as a rule less toxic than the aliphatic polyamines but on the other hand cure more slowly, and at only moderately elevated cure temperatures (for example 40° C.) it is in general not possible to achieve optimum properties of castings or coatings. Curable mixtures of epoxide resins and aromatic polyamines, such as phenylenediamine or 4,4'-diaminodiphenylmethane, can as a rule only be cured at higher temperatures to give industrially usable products. Furthermore the aromatic amines are more or less strongly toxic.

Thus the following sequence of reactivity applies to the main classes of amine curing agents known as curing agents for epoxide resins: aliphatic amines > cycloaliphatic amines > aromatic amines.

For practical requirements, a gap hitherto existed in the reactivity gradation between the aliphatic amines and the cycloaliphatic amines. It has been found that by the use of certain diprimary diamines containing a heterocyclic nucleus and in particular of di-γ-aminopropylhydantoins, it is possible to bridge this previous gap. At only moderately elevated curing temperatures of for example 30° to 60° C. these diaminopropylhydantoins under comparable conditions yield moldings of improved mechanical properties, above all of better impact strength and elongation at break, than the aliphatic and cycloaliphatic polyamines which are known as curing agents. The physiologically harmless di-γ-aminopropylhydantoins are furthermore, for many applications, a fully equivalent replacement for the toxic aromatic amines hitherto used as curing agents for these purposes.

Admittedly some types of amine curing agents for epoxide resins have already been proposed in the literature, in which one or more aminoalkyl groups are located on a heterocyclic nucleus. Thus British Pat. specification No. 869,484 describes mono-aminoalkylpiperazines, such as aminoethylpiperazine, as curing agents for epoxide resins. This class of curing agents yields moldings having good mechanical properties only at higher curing temperatures. By contrast, brittle, industrially unusable castings are obtained at curing temperatures of about 40° C.

French Pat. specification No. 1,399,171 and Austrian Pat. specification No. 250,024 further describe 3,4,5,6-tetrahydropyrimidine derivatives, which carry one or two γ-aminopropyl groups in the 3-position, as curing agents for epoxide resins. Under comparable curing conditions, these tetrahydropyrimidine derivatives however yield moldings having lower impact strengths and elongations at break than the moldings manufactured with the aid of the present γ-aminopropylhydantoins.

The subject of the present invention are thus curable mixtures which are suitable for the manufacture of moldings, impregnations, coatings and adhesive bonds and which are characterized in that they contain (a) a polyepoxide compound with an average of more than one epoxide group in the molecule; and (b) as the curing agent, a di-(N-γ-aminopropyl)-hydantoin of formula

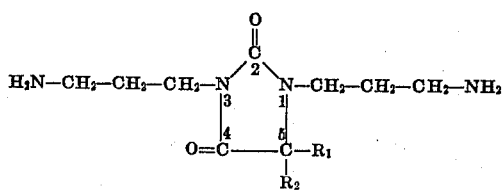

(I)

wherein $R_1$ and $R_2$ independently of each other denote a hydrogen atom or an aliphatic, such as alkenyl with one to four carbon atoms cycloaliphatic such as cyclohexyl or cyclohexenyl or aromatic hydrocarbon residue, preferably a lower alkyl residue with one to four carbon atoms, or wherein $R_1$ and $R_2$ together form a divalent aliphatic or cycloaliphatic hydrocarbon residue, preferably a tetramethylene residue or pentamethylene residue.

As N-γ-aminopropyl-hydantoins of formula (I) there may for example be mentioned: 1,3-di-(γ-aminopropyl)-5,5-dimethylhydantoin, 1,3-di-(γ-aminopropyl)-5-methyl-5-ethylhydantoin, 1,3-di-(γ-aminopropyl)-5-methylhydantoin, 1,3-di-(γ-aminopropyl)-5-ethylhydantoin, 1,3-di-(γ-aminopropyl)-5-isopropylhydantoin, 1,3-di-(γ-aminopropyl)-hydantoin, 1,3-di-(γ-aminopropyl)-5,5-pentamethylenehydantoin (=1,3-di-(γ-aminopropyl)-1,3-diaza-spiro (4.5)-decane-2,4-dione), 1,3-di-(γ-aminopropyl)-5,5-tetramethylenehydantoin (=1,3-di-(γ-aminopropyl)-1,3-diaza-spiro (4.4)-nonane-2,4-dione), 1,3-di-(γ-aminopropyl)-5-methyl-5-phenylhydantoin and 1,3-di-(γ-aminopropyl)-5,5-diphenylhydantoin.

N-γ-Aminopropyl-hydantoins of formula (I) can be conveniently manufactured by cyanethylation of a hydantoin of formula

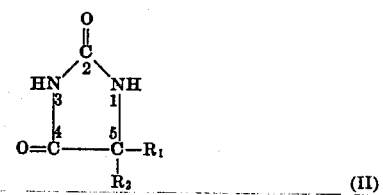

(II)

wherein $R_1$ and $R_2$ have the above-mentioned significance, and subsequent catalytic hydrogenation of the resulting di-(N-γ-cyanethyl)-hydantoins in the presence of ammonia and a hydrogenation catalyst such as for example Raney nickel or Raney cobalt.

Hydantoins of formula (II) which can be subjected to the cyanethylation are for example hydantoin, 5-methylhydantoin, 5-methyl-5-ethylhydantoin, 5-n-propylhydantoin, 5-isopropylhydantoin, 1,3-diaza-spiro (4.5)-decane-2,4-dione, 1,3-diaza-spiro (4.4)-nonane-2,4-dione and 5,5-dimethylhydantoin.

The N-γ-aminopropyl-hydantoins of formula (I) newly proposed as curing agents, and their manufacture, are described in Japanese Pat. specification No. 276,504. However, their use as curing agents for epoxide resins is not mentioned anywhere in this specification, nor made obvious to the expert.

Appropriately, 0.5 to 1.3 equivalents, preferably about 1.0 equivalent, of nitrogen-bonded active hydrogen atoms of the N-γ-aminopropyl-hydantoin of formula (I) are used per 1 equivalent of epoxide groups of the polyepoxide compound (a).

Possible polyepoxide compounds (a) are above all those with an average of more than one glycidyl group, β-methylglycidyl group or 2,3-epoxycyclopentyl group bonded to a heteroatom (for example sulphur, preferably oxygen or nitrogen); the following may be mentioned especially: bis(2,3-epoxycyclopentyl)ether, diglycidyl ethers or polyglycidyl ethers of polyhydric aliphatic alcohols, such as 1,4-butanediol, or polyalkylene glycols, such as polypropylene glycols; diglycidylethers or polyglycidyl ethers of cycloaliphatic polyols, such as 2,2-bis-(4'-hydroxycyclohexyl)propane; diglycidyl ethers or polyglycidyl ethers of polyhydric phenols, such as resorcinol, bis-(p-hydroxyphenyl)methane, 2,2-bis(p-hydroxyphenyl)-propane (=diomethane), 2,2-bis(4'-hydroxy-3',5'1,1,2,2-tetrakis-(p-hydroxyphenyl)ethane, or of condensation products of phenols with formaldehyde obtained under acid conditions, such as phenol novolacs and cresol novolacs; di- and poly-(β-methylglycidyl)-ethers of the above-mentioned polyglycidyl alcohols or polyhydric phenols; polyglycidyl esters of polybasic carboxylic acids, such as phthalic acid, terephthalic acid, Δ⁴-tetrahydrophthalic acid and hexahydrophthalic acid; N-glycidyl derivatives of amines, amides and heterocyclic nitrogen bases, such as N,N-diglycidyl-aniline, N,N-diglycidyl-toluidine, N,N,N',N'-tetraglycidyl-bis(p-aminophenyl)-methane; triglycidyl-isocyanurate; N,N-diglycidyl-ethyleneurea; N,N'-diglycidyl-5,5-dimethyl-hydantoin, N,N'-diglycidyl-5-isopropyl-hydantoin; N,N'-diglycidyl-5,5-dimethyl-6-isopropyl-5,6-dihydro-uracil.

If desired, active diluents such as for example styrene oxide, butyl glycidyl ether, isooctyl glycidyl ether, phenylglycidyl ether, cresyl glycidyl ether or glycidyl esters of synthetic highly branched mainly tertiary aliphatic monocarboxylic acids ("CARDURA E") can be added to the polyepoxides in order to lower the viscosity.

The curing of the curable mixtures according to the invention to give moldings and the like is appropriately carried out in the temperature range of 20° to 120° C., preferably at 30° to 60° C. The curing can, in a known manner, also be carried out in two or more stages, with the first curing stage being carried out at a lower temperature (for example about 40° C.) and the post-curing at a higher temperature (for example 100° C.).

The curing can, if desired, also be carried out in two stages by first prematurely stopping the curing reaction or carrying out the first stage at room temperature or at only slightly elevated temperature, whereupon a curable precondensate which is still fusible and soluble (a so-called "B-stage") is obtained from the epoxide component (a) and the amine curing agent (b). Such a precondensate can for example serve for the manufacture of "prepregs," compression molding compositions or especially sintering powders.

In order to shorten the gelling times or cure times, known accelerators for curing with amines, for example monophenols or polyphenols, such as phenol or diomethane, salicylic acid, tertiary amines or salts of thiocyanic acid, such as NH₄SCN, can be added.

The term "curing" as used here denotes the conversion of the soluble, either liquid or fusible, polyepoxides into solid, insoluble and infusible, three-dimensionally cross-linked products or materials, and in particular as a rule with simultaneous shaping to give moldings, such as castings, pressings, laminates and the like or "two-dimensional structures" such as coatings, lacquer films or adhesive bonds.

The curable mixtures according to the invention from polyepoxide compounds (a) and di-γ-aminopropylhydantoins of formula (I) as curing agents (b) can furthermore be mixed, in any stage before curing, with the usual modifiers such as extenders, fillers and reinforcing agents, pigments, dyestuffs, organic solvents, plasticizers, flow control agents, agents for conferring thixotropy, flameproofing substances or mold release agents.

As extenders, reinforcing agents, fillers and pigments which can be employed in the curable mixtures according to the invention there may for example be mentioned: coal tar, bitumen, textile fibers, glass fibers, asbestos fibers, boron fibers, carbon fibers, cellulose, polyethylene powder, polypropylene powder; quartz powder; mineral silicates such as mica, asbestos powder or slate powder; kaolin, aluminum oxide trihydrate, chalk powder, gypsum, antimony trioxide, bentones, silica aerogel ("AEROSIL"), lithopone, baryte, titanium dioxide, carbon black, graphite, oxide colors such as iron oxide, or metal powders, such as aluminum powder or iron powder.

Suitable organic solvents for modifying the curable mixtures are for example toluene, xylene, n-propanol, butyl acetate, acetone, methyl ethyl ketone, diacetone-alcohol, ethylene glycol monomethyl ether, monoethyl ether and monobutyl ether.

Dibutyl, dioctyl and dinonyl phthalate, tricresyl phosphate, trixylenyl phosphate and also polypropylene glycols can be employed as plasticizers for modifying the curable mixtures.

Silicones, cellulose acetobutyrate, polyvinyl butyral, waxes, stearates and the like (which in part are also employed as mold release agents) can be added as flow control agents when employing the curable mixtures, especially in surface protection.

Especially for use in the lacquer field, the polyepoxide compounds can furthermore be partially esterified in a known manner with carboxylic acids, such as, especially, higher unsaturated fatty acids. It is furthermore possible to add other curable synthetic resins, for example phenoplastics or aminoplastics, to such lacquer resin formulations.

The curable mixtures according to the invention can be manufactured in the usual manner with the aid of known mixing equipment (stirrers, kneaders, rolls and the like).

The curable epoxide resin mixtures according to the invention are above all employed in the fields of surface protection, the electrical industry, laminating processes and the building industry. They can be used, in a formulation suited in each case to the special end use, in the unfilled or filled state, optionally in the form of solutions or emulsions, as paints, lacquers, as sintering powders, compression molding compositions, injection molding formulations, dipping resins, casting resins, impregnating resins, binders and adhesives as tool resins, laminating resins, sealing and filling compositions, floor covering compositions and binders for mineral aggregates.

In the examples which follow, unless otherwise stated, parts denote parts by weight and percentages denote percentages by weight. Parts by volume to parts by weight have the same relation as the milliliter to the gram.

The following epoxide resin was used for the manufacture of curable mixtures described in the examples:

Epoxide Resin A

Polyglycidyl ether resin (industrial product) manufactured by condensation of diomethane (2,2-bis(p-hydroxyphenyl)-propane) with a stoichiometric excess of epichlorhydrin in the presence of alkali, consisting mainly of diomethane-diglycidyl ether of formula

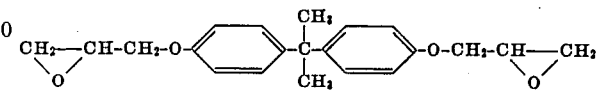

which is liquid at room temperature and has the following characteristics:

Epoxide content: 5.1 to 5.5 epoxide equivalents/kg.
Viscosity (Hoeppler) at 25° C.: 9,000–13,000 cp.

Epoxide Resin B

Hexahydrophthalic acid diglycidyl ester (industrial product):

Epoxide content: 6.3 epoxide equivalents/kg.
Viscosity (Hoeppler) at 25° C.: 475 cp.

Epoxide Resin C

Polyglycidyl ether resin (industrial product) consisting mainly of the diglycidyl ether of 2,2-bis-(4'-hydroxycyclohexyl)-propane of formula

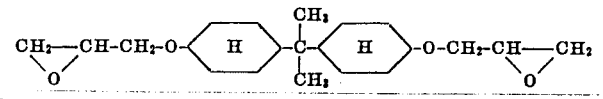

which is liquid at room temperature and has the following characteristics:

Epoxide content: 4.46 epoxide equivalents/kg.
Viscosity (Hoeppler) at 25° C.: 2,140 cp.

For determination of the mechanical and electrical properties of the curable mixtures described in the examples which follow, sheets of 135×135×4 mm. were manufactured for determining the flexural strength, deflection, impact strength and water absorption. The test specimens (60×10×4 mm.) for determining the water absorption and for the flexing test and impact test (VSM 77,103 or 77,105 respectively) were machined from the sheets.

Test specimens of dimensions 120×15×10 mm. were in each case cast for determining the heat distortion point according to Martens (DIN 53,458).

Sheets of dimensions 120×120×4 mm. were cast for testing the arcing resistance and the tracking resistance (VDE 0303).

The di-γ-aminopropyl-hydantoins used as curing agents in the examples which follow were manufactured as follows:

1. Manufacture of 1,3-di-(γ-aminopropyl)-5,5-dimethylhydantoin

A mixture of 515 g. of 1,3-di-(β-cyanethyl)-5,5-dimethylhydantoin (2.2 mols), 35 g. of Raney nickel, 660 ml. of dioxan and 260 g. of ammonia gas is hydrogenated at 100° C. and 100 atmospheres hydrogen pressure for 12 hours in a stirred autoclave. The resulting solution is filtered to separate off the nickel and is subsequently concentrated to constant weight on a rotary evaporator (80° C./0.1 mm. Hg).

482 g. of an oily liquid consisting of 1,3-di-(γ-aminopropyl)-5,5-dimethylhydantoin (90.5 percent of theory) are obtained, having an amine group content of 7.91 equivalents/kg. (corresponding to 95.6 percent of theory) and a viscosity (Hoeppler) at 20° C. of 1,240 cp.

2. Manufacture of 1,3-di-(γ-aminopropyl)-5-methyl-5-ethylhydantoin

A mixture of 488 g. (1.96 mols) of 1,3-di-(β-cyanethyl)-5-methyl-5-ethylhydantoin with 480 ml. of absolute ethyl alcohol, 50 g. of Raney nickel and 240 g. of ammonia gas is hydrogenated over the course of about 7 hours in a stirred autoclave at 100° C. and at a total pressure of 125 atmospheres. After filtering off the catalyst, the resulting blue solution is concentrated to constant weight on a rotary evaporator, finally at 80° C. (about 0.1 mm. Hg). 480 g. (95.6 percent of theory) of a blue viscous liquid are obtained. According to potentiometric titration in an aqueous medium with 1 N HCl the product has an amine group content of 7.4 equivalents/kg. (95 percent of theory).

3. Manufacture of 1,3-di-(γ-aminopropyl)-5,5-diethylhydantoin

The hydrogenation of 1,310 g. of 1,3-di-(β-cyanethyl)-5,5-diethylhydantoin in the presence of 1,250 ml. of absolute ethyl alcohol, 131 g. of Raney nickel and 650 g. of ammonia gas is carried out as described in manufacturing example 2. After removing the volatile constituents, 1,323 g. (98 percent of theory) of a viscous, blue liquid having an amine group content of 7.18 equivalents/kg. (97 percent of theory) are obtained.

For further purification, the crude product is distilled from a Claisen flask at about 0.05 mm. Hg (boiling range: 155° to 165° C.) and yields colorless viscous diamine having an amine group content of 7.27 equivalents/kg. (98.3 percent of theory) in a yield of 92 percent (calculated relative to crude diamine employed).

4. Manufacture of 1,3-di-(γ-aminopropyl)-5-isopropylhydantoin

The hydrogenation of 124.3 g. of 1,3-di-(β-cyanethyl)-5-isopropylhydantoin in the presence of 125 ml. of absolute ethyl alcohol, 12.5 g. of Raney nickel and 60 g. of ammonia gas is carried out in a 500 ml. stirred autoclave for about 6 hours at 100° C. and a total pressure of 125 atmospheres. After removing the catalyst and the volatile constituents (finally at about 0.1 mm. Hg and 60° C.), 126 g. (98.3 percent of theory) of a blue viscous liquid are obtained, having an amine group content of 7.25 equivalents/kg. (93 percent of theory).

5. Manufacture of 1,3-di-(γ-aminopropyl)-5,5-pentamethylenehydantoin

The hydrogenation of 137 g. (0.5 mol) of 1,3-di-(β-cyanethyl)-5,5-pentamethylenehydantoin in the presence of 130 ml. of absolute alcohol, 14 g. of Raney nickel and 50 g. of ammonia gas is carried out in a 500 ml. autoclave for about 9 hours at 100° C. and a total pressure of 125 atmospheres. After filtering off the catalyst, the solution approx. freed of volatile constituents (finally at about 0.1 mm. Hg/80° C.). 136.5 g. (96.5 percent of theory) of crude diamine having an amine group content of 6.94 equivalents/kg. (98 percent of theory) are obtained.

6. Manufacture of 1,3-di-(γ-aminopropyl)-5-methyl-5-phenylhydantoin

The hydrogenation of 118.5 g. (0.4 mol) of 1,3-di-(β-cyanethyl)-5-methyl-5-phenylhydantoin in the presence of 120 ml. of absolute ethyl alcohol, 12 g. of Raney nickel and 60 g. of ammonia gas is carried out in a 500 ml. autoclave for about 6 hours at 100° C. and a total pressure of 125 atmospheres. The catalyst is filtered off and the solution is freed of volatile constituents on a rotary evaporator (finally at about 80° C./0.1 mm. Hg).

120 g. (98.5 percent of theory) of a crude diamine which is highly viscous at room temperature and has an amine group content of 6.38 equivalents/kg. (97 percent of theory) are obtained.

7. Manufacture of 1,3-di-(γ-aminopropyl)-5,5-diphenylhydantoin

The hydrogenation of 716 g. (2.0 mols) of 1,3-di-(β-cyanethyl)-5,5-diphenylhydantoin is carried out in a 5 liter stirred autoclave in the presence of 72 g. of Raney nickel, 716 g. of isopropyl alcohol and 350 g. of ammonia gas for about 7 hours at 100° C. and a total pressure of 125 atmospheres. The working up is carried out as in the preceding examples.

761 g. (91.6 percent of theory) of a crude diamine which is highly viscous at room temperature and has an amine group content of 5.18 equivalents/kg. (95 percent of theory) are obtained.

EXAMPLE 1

100 g. of epoxide resin A (liquid diomethane-diglycidyl ether having an epoxide content of 5.25 epoxide equivalents/kg. and a viscosity of about 9,500 cp. at 25° C.) are homogeneously mixed at 40° C. with 31.5 g. of 1,3-di(γ-aminopropyl)-5,5-dimethylhydantoin having an amine group content of 7.91 equivalents/kg. (corresponding to a ratio of equivalents of epoxide groups to equivalents of nitrogen-bonded active hydrogen atoms = approx. 1:1) and the resulting mixture (sample A) is poured into aluminum molds (135×135×Φ$^4$ mm.) prewarmed to 40° C. Curing takes place for 24 hours at 40° C.

The properties of the castings can be seen from table I below:

Table I

|  | Sample A |
|---|---|
| g. of amine curing agent per 100 g. of epoxide resin A | =31.5 |
| Flexural strength (VSM 77,103) | 12.3 kg./mm.$^2$ |
| Deflection (VSM 77,103) | >17.5 mm. |
| Impact strength (VSM 77,105) | >18.5 cm.kg./cm.$^2$ |
| Heat distortion point according to Martens (DIN 53,458) | 61° C. |
| Water absorption: 4 days, 20° C. | 0.28% |

Comparison experiment:

For comparison purposes, samples B, C, D and E were prepared, in each case mixing 100 g. of the liquid epoxide resin A used in example 1 (bisphenol-A-polyglycidyl ether resin with an epoxide content of 5.35 epoxide equivalents/kg.) with the equivalent amounts given in table II below, of triethylenetetramine (sample B), 1,6-hexamethylenediamine (sample C), bis-(4-amino-3-methyl-cyclohexyl)methane (sample D) and 1-(2'-aminoethyl)piperazine (sample E) at 40° C. The mixtures were cured for 24 hours at 40° C. analogously to sample A according to example 1, and the properties of the castings were determined.

The results can be seen from table II below:

TABLE II

| | B, (triethyl-enetetramine) | C, (hexameth-ylenediamine) | D, (bis-(4-amino-3-methyl)-cyclo-hexylmethane) | E, (1-(2'-ami-noethyl)-piperazine) |
|---|---|---|---|---|
| G. of amine curing agent per 100 g. of epoxide resin A | 10 | 15 | 33 | 23 |
| Flexural strength (VSM (mg./mm.²)) | 10.9 | 12.0 | | |
| Deflection VSM (mm.) | 4.4 | 10.5 | | |
| Impact strength VSM (cmkg./cm.²) | 6.9 | 8.8 | Brittle, not machinable | |
| Heat distortion point according to Martens DIN (° C.) | 60 | 67 | | |
| Water absorption 4 days, 20° C. (percent) | 0.21 | 0.29 | | |

The amount of amine curing agent in samples B to E in each case corresponds to 1 equivalent of nitrogen-bonded hydrogen atoms per 1 epoxide equivalent of the epoxide resin.

The experimental results show that the test specimens cured at 40° C. from sample A according to the invention possess considerably better mechanical properties than the test specimens obtained under the same curing conditions from samples B, C, D and E according to the state of the art.

EXAMPLE 2

A curable mixture according to example 1 from 100 g. of epoxide resin A and 31.5 g. of 1,3-di($\gamma$-aminopropyl)-5,5-dimethylhydantoin (sample $A_1$) is poured into aluminum molds analogously to example 1 and subjected to the following curing cycle: 24 hours, 40° C. + 6 hours, 100° C.

For comparison, a known curable mixture is manufactured from 100 g. of epoxide resin A and 29 g. of 2-methyl-3,3-bis-($\gamma$-aminopropyl)-3,4,5,6-tetrahydropyrimidine (sample F). This comparison mixture is cured analogously to the sample $A_1$ according to the invention for 24 hours at 40° C. and then for 6 hours at 100° C.

Table III below gives the properties of castings obtained with the sample $A_1$ according to the invention and with the known sample F:

This experiment shows that the test specimens from sample $A_1$ according to the invention possess a higher impact strength and deflection than the test specimens obtained under analogous curing conditions from the known sample F.

EXAMPLE 3

Curable mixtures were manufactured according to example 1 from 100 g. of epoxide resin A at a time and the various substituted 1,3-di-($\gamma$-aminopropyl)-hydantoins indicated in the table which follows, and were poured, analogously to example 1, into prewarmed molds in order to manufacture a sheet of dimensions 135×135×4 mm. and a test specimen of dimensions 120×15×10 mm. The mixtures were in each case cured for 24 hours at 40° C. and subsequently post-cured for 6 hours at 100° C.

Test specimens of dimensions 60×10×4 mm. were manufactured from the sheets thus obtained in order to determine the flexural strength, deflection, impact strength and water absorption. The test specimens cast additionally to the sheets served for the determination of the heat distortion point according to Martens.

Table IV which follows summarizes the properties of the cured molded materials manufactured with the various 1,3-di-($\gamma$-aminopropyl)-hydantoins.

TABLE IV

| Diamine | 1,3-di-($\gamma$-ami-nopropyl)-5,5-diethyl-hydantoin | 1,3-di-($\gamma$-ami-nopropyl)-5-methyl-5-eth-ylhydantoin | 1,3-di-($\gamma$-ami-nopropyl)-5-isopropyl-hydantoin | 1,3-di-($\gamma$-ami-nopropyl)-5,5-pentamethyl-enehydantoin |
|---|---|---|---|---|
| G. of amine curing agent per 100 g. of epoxide resin A | 35 | 33 | 33 | 36 |
| Curing conditions | (¹) | (¹) | (¹) | (¹) |
| Flexural strength (VSM 77,103), kg./mm.² | 11.5 | 11.2 | 12.1 | 13.7 |
| Deflection (VSM 77,103), mm | 10.5 | 7.8 | 16.3 | 9.6 |
| Impact strength (VSM 77,105), cmkg/cm.² | 49.1 | 19.8 | 37.9 | 33.9* |
| Heat distortion point according to Martens (DIN 53,458), ° C. | 88 | 93 | 73 | 59 |
| Weight increase after storage in water (4 days at 20° C.), percent | 0.37 | 0.30 | 0.30 | 0.24 |

¹ 24 hours at 40°C. plus 6 hours at 100°C.

Table III

| | Sample $A_1$ | Sample F |
|---|---|---|
| g. of amine curing agent per 100 g. of epoxide resin A | 31.5 | 29 |
| Flexural strength VSM (kg./mm.²) | 12.2 | 12.0 |
| Deflection VSM (mm.) | 15.1 | 10 |
| Impact strength VSM (cm.kg./cm.²) | >23.6 | 14 |
| Water absorption 4 days, 20° C. (%) | 0.25 | 0.35 |

EXAMPLE 4

Two differently substituted 1,3-di-($\gamma$-aminopropyl)-hydantoins were used as curing agents for epoxide resin B (liquid hexahydrophthalic acid diglycidyl ester having an epoxide content of 6.3 epoxide equivalents/kg. and a viscosity of 475 cp. at 25° C.

The diamines indicated in table V which follows were in each case carefully mixed with epoxide resin B in the indicated mixing ratio. A part of the mixture was spread on the ends, which had beforehand been roughened by grinding and cleaned by washing with acetone, of test strips of an aluminum alloy (registered trade name "Anticorodal B") of dimensions 170×25×1.5 mm. Two of these test strips at a time were so lined up by means of a gauge that the ends spread with the resin-curing agent mixture overlap by 10 mm., and were then fixed in this position by means of a hose clip. The resin-curing agent mixture here used as the adhesive was cured for 24 hours at 40° C. and post-cured for 6 hours at 100° C. The test specimens were then cooled to room temperature and the tensile shear strength of the adhesive bond was determined in the tensile test.

The remainder of the resin-curing agent mixture was spread on aluminum sheets of dimensions 150×70×0.8 mm. and the thin layer coating thus obtained was also cured for 24 hours at 40° C. and 6 hours at 100° C. After curing, the coating was tested for scratch resistance, tackiness (after wiping over with an acetone-soaked cottonwool pad) and resistance towards bending of the substrate.

The results of the individual tests are summarized in table V below.

10 mm. Further, a small amount of the mixture was spread on the ends, previously roughened by grinding and cleaned by washing with acetone, of test strips of an aluminum alloy (registered trade name "Anticorodal B") of dimensions 170×25×1.5 mm. Two of these test strips at a time were so lined up by means of a gauge that the ends spread with the resin-curing agent mixture overlap by 10 mm., and were then fixed in this position by means of a hose clip.

Both the curable mixture present in the sheet molds and the curable mixture used for gluing the sheet metal strips were cured for 24 hours at 40° C. and post-cured for 6 hours at 100° C.

Test specimens of dimensions 60×10×4 mm. were manufactured from the sheet for determining the flexural strength. The test rod cast additionally to the sheet served for the determination of the heat distortion point according to Martens. The

TABLE V

| Diamine | 1,3-di-(γ-aminopropyl) 5,5-diethylhydantoin | 1,3-di-(γ-aminopropyl) 5-isopropylhydantoin |
| --- | --- | --- |
| g. of amine curing agent per 10 g. of epoxide resin B. | 4.25 | 4.03 |
| Curing conditions | 24 hours at 40° C. plus 6 hours at 100° C. | |
| Tensile shear strength on "Anticorodal B." | 0.78 kg./mm.² | 0.86 kg./mm.² |
| Assessment of the cured coating. | Scratch-resistant coating which after treatment with an acetone-soaked cottonwool pad no longer becomes tacky. The cured resin layer does not flake off even after repeated bending of the metal sheet and shows no cracks. | Scratch-resistant coating which after treatment with an acetone-soaked cottonwool pad no longer becomes tacky and neither tears nor flakes off on bending the metal sheet. |

EXAMPLE 5

Curable mixtures with two different substituted 1,3-di-(γ-aminopropyl)-hydantoins were manufactured as in example 4, but with the difference that instead of epoxide resin B the epoxide resin C (liquid diglycidyl ether of 2,2-bis-(4'-hydroxycyclohexyl)-propane having an epoxide content of 4.46 epoxide equivalents/kg. and a viscosity of 2,140 cp.) was used.

The mixing ratios and curing conditions used, and the resulting tensile shear strength values of the test specimens and the assessment of the coating (curing in a thin layer) are summarized in table VI below.

TABLE VI

| Diamine | 1,3-di-(γ-aminopropyl) 5,5-diethylhydantoin | 1,3-di-(γ-aminopropyl) 5-isopropylhydantoin |
| --- | --- | --- |
| g. of amine curing agent per 10 g. of epoxide resin C. | 3.01 | 2.85 |
| Curing conditions | 24 hours at 40° C. plus 6 hours at 100° C. | |
| Tensile shear strength on "Anticorodal B." | 1.09 kg./mm.² | 1.13 kg./mm.² |
| Assessment of the cured coating. | Scratch-resistant coating which after treatment with an acetone-soaked cottonwool pad no longer becomes tacky and neither tears nor flakes off on repeated bending of the metal sheet. | Scratch-resistant coaitnf. Does not become tacky after treatment with an acetone-soaked cottonwool pad. Withstands repeated bending of the sheet metal substrate without tearing or flaking off. |

EXAMPLE 6

100 g. of epoxide resin A having an epoxide content of 5.14 epoxide equivalents/kg. were prewarmed to about 40° C. and carefully mixed with 39 g. of 1,3-di-(γ-aminopropyl)-5-methyl-5-phenylhydantoin. The mixture was poured into prewarmed metal molds to manufacture a sheet of dimensions 135×135×mm. and a test specimen of dimensions 120×15× glued sheet metal strips were used for testing the tensile shear strength in the tensile test. The following results were obtained:

| | |
| --- | --- |
| Flexural strength (VSM 77,103) | 11.9 kg./mm.² |
| Deflection (VSM 77,103) | 5.6 mm. |
| Impact strength (VSM 77,105) | 5.3 cm.kg./cm.² |
| Tensile shear strength on "Anticorodal B" | 0.79 kg./mm.² |
| Heat distortion point according to Martens (DIN 53,458) | 84° C. |

EXAMPLE 7

100 g. of epoxide resin A having an epoxide content of 5.14 epoxide equivalents/kg. were warmed to about 40° C., carefully mixed with 48 g. of 1,3-di-(γ-aminopropyl)-5,5-diphenylhydantoin and then processed as described in the preceding example 6. The test of the cured material showed the following properties:

| | |
| --- | --- |
| Flexural strength (VSM 77,103) | 11.9 kg./mm.² |
| Deflection (VSM 77,103) | 6.7 mm. |

| | |
|---|---|
| Impact strength (VSM 77,105) | 10.6 cm.kg./cm.² |
| Tensile shear strength on "Anticorodal B" | 0.50 kg./mm.² |
| Heat distortion point according to Martens (DIN 53,458) | 96° C. |
| Weight increase after storage in water (4 days, 20° C.) | 0.21% |

We claim:

1. A composition of matter which comprises (a) a 1,2-polyepoxide compound having an average of more than one 1,2-epoxide group in the molecule; and (b) as the curing agent, a di-(N-γ-aminopropyl)-hydantoin of formula

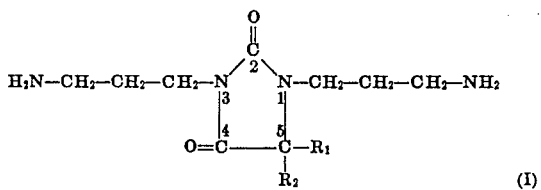

wherein $R_1$ and $R_2$ each represents a member selected from the group consisting of a hydrogen atom, alkyl with one to four carbon atoms, alkenyl with one to four carbon atoms, cyclohexenyl, cyclohexyl and phenyl or wherein $R_1$ and $R_2$ together form a divalent residue selected from the group consisting of tetramethylene residue and pentamethylene residue.

2. A composition according to claim 1 which contains 1,3-di-(γ-aminopropyl)-5,5-dimethylhydantoin as the curing agent (b).

3. A composition according to claim 1 which contains 1,3-di-(γ-aminopropyl)-5-isopropylhydantoin as the curing agent (b).

4. A composition according to claim 1 which contains 1,3-di-(γ-aminopropyl)-5,5-diethylhydantoin as the curing agent (b).

5. A composition according to claim 1 which contains 1,3-di-(γ-aminopropyl)-5-methyl-5-ethylhydantoin as the curing agent (b).

6. A composition according to claim 1 which contains 1,3-di-(γ-aminopropyl)-5,5-pentamethylene-hydantoin as the curing agent (b).

7. A composition according to claim 1 which contains 0.5 to 1.3, equivalent of nitrogen-bonded active hydrogen atoms of the di-(N-Γ-aminopropyl)-hydantoin (b) per 1 equivalent of epoxide groups of the polyepoxide compound (a).

8. A composition according to claim 1 which contains a polyepoxide compound (a) with an average of more than one glycidyl group, β-methylglycidyl group or 2,3-epoxicyclopentyl group, bonded to a heteroatom, in the molecule.

9. A composition according to claim 1 which contains a polyglycidyl ether of a polyhydric phenol as the polyepoxide compound (a).

10. A composition according to claim 9 which contains a polyglycidyl ether of 2,2-bis-(p-hydroxyphenyl)-propane as the polyepoxide compound (a).

11. A composition according to claim 1 which contains a polyglycidyl ether of a cylcoaliphatic polyol as the polyepoxide compound (a).

12. A composition according to claim 1 which contains the diglycidyl ether of 2,2-bis-(4'-hydroxycyclohexyl)-propane as the polyepoxide compound (a).

13. A composition according to claim 1 which contains a polyglycidyl ester of a polycarboxylic acid as the polyepoxide compound (a).

14. A composition according to claim 13 which contains the diglycidyl ester of Δ⁴-tetrahydrophthalic acid or hexahydrophthalic acid as the polyepoxide compound (a).

* * * * *

CASE 6601/E

PO-1050
(5/69)

UNITED STATES PATENT OFFICE
CERTIFICATE OF CORRECTION

Patent No. 3,635,844              Dated January 18, 1971

Inventor(s) PORRET ET AL

It is certified that error appears in the above-identified patent and that said Letters Patent are hereby corrected as shown below:

The patent date should be changed to read --- January 18, 1972 ---.

Signed and sealed this 13th day of June 1972.

(SEAL)
Attest:

EDWARD M. FLETCHER, JR.
Attesting Officer

ROBERT GOTTSCHALK
Commissioner of Patents